FUNK & PORT.
Coffee Pot.
No. 106,572.
Patented Aug. 23, 1870.
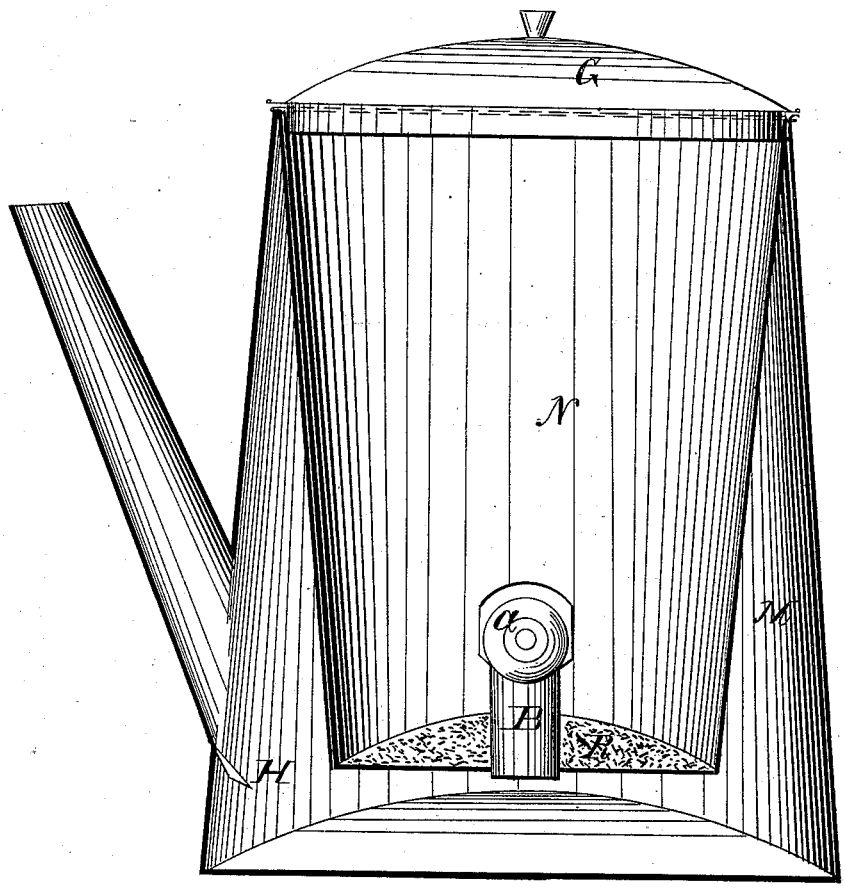
Witnesses.
Bernhard Loebenstein
William Henry Lee
Inventor.
William Funk
George Walter Port

United States Patent Office.

WILLIAM FUNK AND GEORGE WALTER PORT, OF WARRENSBURG, MISSOURI.

Letters Patent No. 106,572, dated August 23, 1870.

COFFEE-POT.

The Schedule referred to in these Letters Patent and making part of the same

*To all whom it may concern:*

Be it known that we, WILLIAM FUNK and GEORGE WALTER PORT, of Warrensburg, in the county of Johnson and State of Missouri, have invented a new and improved Coffee-Pot; and that the following description, taken in connection with the accompanying drawings, hereinafter referred to, forms a full and exact specification of the same, wherein we have set forth the nature and principles of our said invention, by which it may be distinguished from all others of a similar class, together with such parts as we claim as new and desire to have secured to us by Letters Patent.

In the drawings, which are side-sectional views of the device—

The letter *m* represents the body of an ordinary coffee-pot.

*n* is a movable chamber, occupying the interior of the body *m*, fitting it closely at the top, and inside of which, fitting it, is the cover G, and having its bottom, R, made perforated, and is also furnished with tube B, opening upward by means of the globe-valve A.

The letter H represents a chamber or cell formed by a crescent-shaped piece of tin, bent and attached to the body *m*, below the spout, with the convex surface downward, and is designed to retain the sediment within the pot.

In using this coffee-pot, first put sufficient boiling water into the body to cover the perforated bottom R; then place the coffee to be steeped within the chamber *n*, and pour upon it the desired quantity of boiling water; having put on the cover G and closed the spout, let it boil a few minutes, more or less, according to the quality of the beverage being made.

The pressure of the steam outside of the chamber *n* will force the water up into the chamber *n*, through the perforated bottom and the tube B, until the weight of the water is equal to the pressure of steam, when the valve A will drop to its seat, and the water will filter through the perforated bottom R, while the grounds of the coffee will be retained in the chamber *n*.

In the construction of a coffee-pot, we claim—

In combination, the movable chamber *n*, having a perforated bottom, the tube B, the valve A, and the device H, for retaining the sediment, substantially as described.

WILLIAM FUNK.
GEORGE WALTER PORT.

Witnesses:
BERNHARD LOEBENSTEIN,
WILLIAM HENRY LEE.